Oct. 17, 1944.                H. HOHMANN                2,360,421
                        CENTER LOCATING DEVICE
                         Filed Nov. 19, 1943
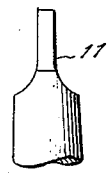
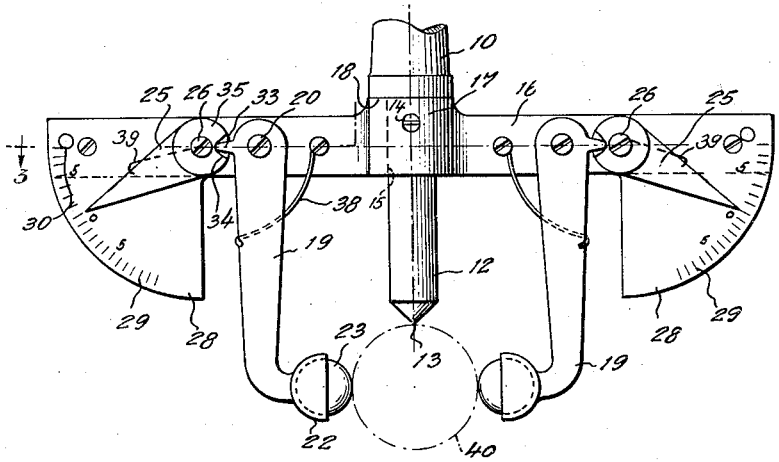
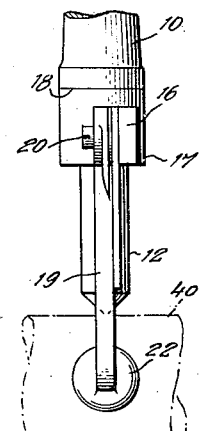
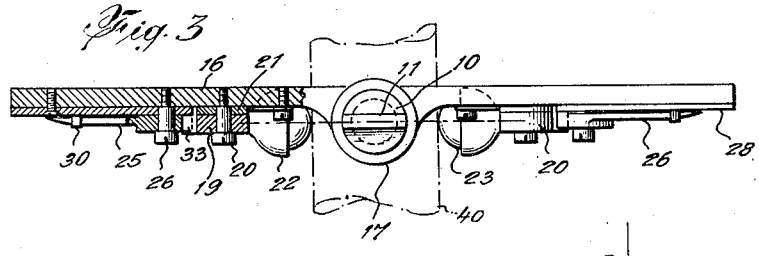
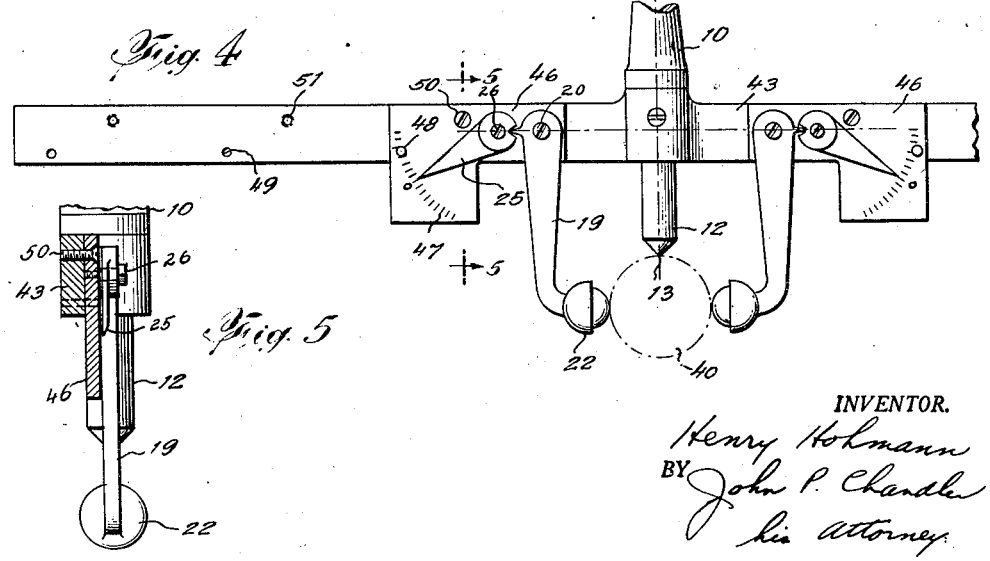
INVENTOR.
Henry Hohmann
BY John P. Chandler
his Attorney Patented Oct. 17, 1944

2,360,421

UNITED STATES PATENT OFFICE 2,360,421

CENTER LOCATING DEVICE

Henry Hohmann, Brooklyn, N. Y.

Application November 19, 1943, Serial No. 510,999

7 Claims. (Cl. 33—191)

This invention relates to a novel center locating device for use in connection with jig boring machines, drill presses, milling cutters, and other related devices, and has for its principal object the provision of a device which will locate centers in rods, shafts, die plates, and other articles, quickly and with great accuracy.

The enormous amount of time required to locate centers with a high order of accuracy is well known to precision workers. For instance, if a machinist is required to drill a transverse hole exactly in the center of a circular shaft, the usual procedure is to place an accurately ground pin in the drill spindle or chuck, secure the shaft to the horizontally movable work table, move the table to a point wherein the pin lightly contacts the side of the work without exerting any pressure thereagainst, then raise the pin just above the work, move the table with the aid of the micrometer slide or spindle a distance equal to one-half the diameter of the work plus one-half the diameter of the pin, then proceed from the opposite side with the identical operation, and then mark the center. Frequently, hours of tedious work are required to locate a center which, with a device of the present invention, could be accomplished in a matter of seconds.

Similar problems are incurred when the center of a rectangular plate is to be located. In all of such operations, the present invention in one of its many possible embodiments may be employed to accurately locate a center point within a few ten-thousandths, and without requiring any special skill on the part of the operator. This may be contrasted with existing practices wherein the degree of accuracy is directly proportional to the skill of the operator, particularly in the manner in which he "feels" the side of the work with the ground pin. The device of the present invention also eliminates the usual practice of drilling a smaller hole as near to the center of the work as possible, and then boring the hole to proper size, which, as is well known, is a lengthy and time-consuming operation, since in many cases the boring operation is also not exactly in the center, and accordingly the work must be discarded and started anew.

Broadly speaking, the centering device of the present invention comprises a supporting element which is associated with the cutting element of the machine. In the case of a jig boring machine, it may be a tapered shank which is inserted in the drill spindle. This tapered shank may be formed at its lower end with a ground pin, and may have a sharpened mark-producing point exactly in the center of its lower terminal. A cross-bar is carried by the ground pin at a suitable point between its ends, such bar lying exactly at right angles to the axis of rotation of the tapered shank. On each side of the center of the cross-bar at equally-spaced points are pivoted fingers having inwardly facing, sensing surfaces, preferably hemispherical in shape. Pivoted to the cross-bar adjacent to each pivoted finger is a pointer, there also being provided some movement transmission means, such as a gear, so formed as to prevent any backlash. A fixed scale for the pointer is likewise carried adjacent to the outer terminals of the cross-bar.

The tapered shank is inserted in the spindle, and the work supported on the horizontally-movable work table. The sensing surfaces of the fingers are now permitted to contact the opposed sides of the work to be drilled, and the work support moved transversely until the pointers have the same reading at each end of the cross-arm. Once this is accomplished, the spindle may be lowered until the point at the lower end of the ground pin contacts and marks the work, thus giving the exact center.

In the case of a milling cutter wherein it is desired to cut a channel in the exact center of the work, the tapered shank may be replaced by a suitable support which contacts the opposite edges of the cutter while maintained in a vertical position. Again, the work is moved to one side or the other until the indicators have the same reading at opposite ends of the cross-arm. The device may then be removed and the cutting operation commenced. If desired, the circular milling cutter may be removed from the shaft and a simple adaptor replaced thereon, having a tapered opening, similar to that of the spindle, which receives the tapered shank.

In the drawing:

Fig. 1 is a broken front elevation of one embodiment of the present invention.

Fig. 2 is a side elevation thereof.

Fig. 3 is a horizontal section taken on line 3—3 of Fig. 1.

Fig. 4 is a broken front elevation of a modified form of the present invention.

Fig. 5 is a vertical section taken on line 5—5 of Fig. 4.

Referring now more particularly to Figs. 1, 2 and 3, 10 comprises an accurately-formed tapered shank having a flattened upper terminal 11, which may be received in the drill spindle. A ground pin 12 is formed or mounted at the lower end of the tapered shank, the axis of the ground pin coinciding with that of the tapered shank. Whereas the shank and the pin may be formed in two pieces, it is nevertheless simpler to form them in one piece. At its lower terminal, the pin is formed with a point 13 in its exact center. A cross-bar 16, having an enlarged central portion 17, is provided with a vertical opening 15 which receives the pin 12, the upper edge of the enlarged portion 17 abutting against the shoulder 18 formed at the lower end of the tapered shank. A set screw 14 in the enlarged portion 17 may firmly secure the cross-bar relative to the pin.

A finger 19 is pivotally mounted at 20 on each side of the vertical axis indicated by the broken line down through the center of the shank and the pin, each finger being equally spaced from such axis. The pivotal mounting may comprise a headed pin formed in the manner shown in Fig. 3, and a bushing 21 may be positioned between the finger and the cross-arm 16. At its lower end, each finger may have an inwardly facing, hemispherical cup 22 which receives a spherical sensing element 23 presenting a hemispherical sensing surface. A pointer 25 is pivotally mounted at 26 adjacent to each end of the cross-bar, and between such pointer and the cross-bar a scale 28, having graduations 29 thereon, may be secured. A stop pin 30 may limit upward movement of the pointer.

Suitable movement transmission means between the finger 19 and the pointer 25 are provided. The exact form of such means is a matter of choice, providing, of course, that it be some arrangement wherein backlash is definitely avoided, since backlash would impair the accuracy of the instrument. In the embodiment shown, these means comprise a driving gear 33 formed with a single tooth which is received within a recess 34 in the hub 35 of the pointer. A spring 38 may urge the fingers 19 towards each other. In order to avoid any possibility of backlash, a simple wire spring 39 may be secured at one end thereof to the pivot pin or otherwise, the opposite end being secured to the pointer. In constructing the foregoing embodiment, it is important that the respective axes of fingers 19 and pointers 25 be in a line indicated by the horizontal broken line, which is at right angles with the vertical axis of the tapered pin. It is also important that the centers of the sensing surfaces of elements 23 be aligned with the vertical axis of the tapered shank, as indicated by the broken line in Fig. 3.

In operation, the shank may be inserted in the drill spindle (not shown), and the circular work 40 appropriately secured on the work table. The spindle is now lowered to a point wherein the curved sensing surfaces 23 contact the work. It is not important, however, that these surfaces contact the work exactly half-way between the upper and lower surfaces of such work, just so long as the work is accurately formed. Also, it is not important that the cross-bar lie exactly at a 90° angle to the work (Fig. 3), as will be understood. The graduations 29 on the scales 28 may, if desired, be numbered, and it is now only necessary to move the table forming the support for the work longitudinally of the cross-bar 16 to a point wherein the indicators both have the same reading on the graduations 29. When this is accomplished, the spindle may be lowered sufficiently so that point 13 at the lower end of the pin produces a mark on the work, which, as aforesaid, will be in the exact center thereof. In the event, of course, that a hole is to be drilled immediately in the center of the work 40, no mark need be made on the work, but instead the spindle may be raised, the device removed, a drill inserted in the spindle, and the hole drilled.

In the arrangement shown in Figs. 4 and 5, the shank 10 is formed as in the first embodiment of the invention, but in this case the transverse arm 43 may be somewhat longer than the arm 16 in the first embodiment. In this case, fingers 19 and pointers 25 are mounted on a plate 46, also carrying the graduations 47. Each plate 46 carrying the finger and the pointer is secured to, but removable from, cross-arm 43 to permit such plates to be moved any desired distance from the center of the device. The securing means comprise a dowel 48 carried by the plate which fits into an aperture 49 in the cross-bar, and a screw 50 which is received within a threaded aperture 51 in the cross-bar. Any suitable number of pairs of apertures 49 and threaded apertures 51 may be provided.

Thus, if it is desired to find the center of a relatively wide plate instead of the round material shown at 40, the supporting plates 46 may be moved outwardly on the cross-bar 43 appropriately-spaced distances, and the device used as previously described. Here, again, it is not essential that the cross-bar occupy a position at exactly 90° to the longitudinal edges of the work, as will be obvious. In the event that the work is square or rectangular, and it is desired to find the transverse as well as longitudinal centers, the transverse center may first be located, the point 13 impressed on the work, and the device then rotated 90° for the purpose of finding the center longitudinally.

In many instances of this character, it will be necessary to determine the exact center of the work even though no aperture is to be drilled at such point. For instance, in many cases holes are drilled in die plates or templets in prescribed locations which are designated on the working drawing at a fixed distance from the center point. Accordingly, the center point may be determined in the manner indicated, this point indented with the pointed end 13 of the ground pin, and the centers of the apertures to be drilled then located. In cases wherein a hole is to be drilled in the actual center, as in the case of the circular shaft 40 shown in the drawing, it will not be necessary to mark the point constituting the center, but, on the contrary, when the work has been properly located relative to this center point, the spindle is raised, the apparatus removed, and the drill inserted in the spindle.

In most instances, a precision machine will have the usual spindle with the tapered recess adapted to receive the tapered shank 10. In some cases, however, the boring device will have a chuck rather than a spindle, and in such cases the tapered shank 10 may be employed, or a straight ground pin similar to pin 12 may be employed in place of the tapered shank.

While I have herein shown and described two forms or embodiments of my invention for illustrative purposes, and have disclosed and discussed in detail the construction and arrangement incidental to two specific applications thereof, it is to be understood that the invention is limited neither to the mere details or relative arrangement of parts, nor to its specific embodiments shown herein. In other words, the several embodiments disclosed herein are for purpose of illustration only, and are not to be taken in any limiting sense.

What I claim is:

1. A center locating device for use in connection with a cutting apparatus provided with a vertical spindle formed with means for receiving the cutting element, and means for supporting the work, said device comprising a vertical support formed with a shank at the upper end thereof which is received in the spindle, a horizontal cross-arm carried substantially at its center by said vertical support, pivoted sensing fingers carried by the cross-arm at points spaced equi-distant from the axis of rotation of the vertical support, a pointer carried adjacent to each end of the cross-arm, a fixed scale for each pointer, and means for transmitting movement of the fingers to the pointers, whereby when the work, while contacted on opposite sides by the fingers, is moved to a point wherein the pointers will have identical scale readings, the work will be centrally positioned relative to the shank.

2. A center locating device for use in connection with a cutting apparatus, such as a jig borer or the like, provided with a vertical spindle formed with a tapered seat for the reception of the cutting element, and a horizontally-movable table for supporting the work, said device comprising a vertical support formed with a tapered shank at the upper end thereof which is received in the tapered seat of the spindle, a horizontal cross-arm carried substantially at its center by said vertical support, horizontally-pivoted sensing fingers carried by the cross-arm at opposed points spaced equi-distant from the axis of rotation of the vertical support, a line running through the pivot centers lying at a right angle to said vertical axis, a pointer carried adjacent to each end of the cross-arm, a fixed scale for each pointer, and means for transmitting movement of the fingers to the pointers, whereby when the work is placed on the work table between the fingers, and the work table is moved to a point wherein the pointers will have identical scale readings, the work will be centrally positioned relative to the shank.

3. A center locating device comprising a vertical support formed with a tapered shank at its upper end, a horizontal cross-arm carried by said vertical support, pivoted sensing fingers carried by the cross-arm at points spaced equi-distant from the center of the vertical support, a pointer carried adjacent to each end of the cross-arm, a fixed scale associated with each pointer, and means for transmitting movement of the fingers to the pointers.

4. A center locating device for use in connection with a cutting apparatus, such as a jig borer or the like, provided with a vertical spindle formed with a recess for the cutting element, and a horizontally-movable table for supporting the work, said device comprising a vertical support formed with a shank at the upper end thereof which is received in the recess of the spindle, a horizontal cross-arm carried by said vertical support, pivoted sensing fingers carried by the cross-arm at points spaced equi-distant from the axis of rotation of the vertical support, said fingers being provided with generally hemispherical sensing surfaces, a pointer carried adjacent to each end of the cross-arm, a fixed scale associated with each pointer, and gear means for transmitting movement of the fingers to the pointers.

5. A center locating device for use in connection with a cutting apparatus provided with a vertical spindle formed with a recess for the cutting element, and a horizontally-movable table for supporting the work, said device comprising a vertical support formed with a shank at the upper end thereof which is received in the recess of the spindle, a horizontal cross-arm carried substantially at its center by said vertical support, pivoted sensing fingers carried by the cross-arm at points spaced equi-distant from the axis of rotation of the vertical support, spring means for urging the fingers towards each other, a line running through the pivot centers lying at a right angle to said vertical axis, a pointer carried adjacent to each end of the cross-arm, a fixed scale associated with each pointer, and gear means for transmitting movement of the fingers to the pointers, the scales being arranged to have identical readings when the sensing fingers are equally spaced from the vertical axis.

6. A center locating device for use in connection with a cutting machine having a rotatable spindle for the cutting element and a support for the work, said device including a vertical shank which is received in the spindle, a horizontal cross-arm carried by the shank, sensing fingers pivotally carried by the cross-arm, the pivots being located equi-distant from the axis of rotation of the shank, and a scale for each finger indicating relative movement thereof from the axis of the shank.

7. A center locating device for use in connection with a cutting apparatus, such as a jig borer or the like, provided with a vertical spindle formed with a seat for the reception of the cutting element, and a horizontally-movable table for supporting the work, said device comprising a vertical support formed with a shank at the upper end thereof which is received in the tapered seat of the spindle, a horizontal cross-arm carried substantially at its center by said vertical support, plates removably carried by the cross-arm at points equally spaced from the axis of rotation of the vertical support, a horizontally-pivoted sensing finger, and a pointer carried by each plate adjacent to each end of the cross-arm, a fixed scale for each pointer, and means for transmitting movement of the fingers to the pointers.

HENRY HOHMANN.